United States Patent [19]

Matsubara et al.

[11] Patent Number: 4,644,462
[45] Date of Patent: Feb. 17, 1987

[54] INPUT/OUTPUT INTERRUPT SYSTEM

[75] Inventors: Yoshiaki Matsubara, Tokyo; Masato Tsuru, Yokohama, both of Japan

[73] Assignee: Fujitsu Limited, Kawasaki, Japan

[21] Appl. No.: 529,335

[22] Filed: Sep. 6, 1983

[30] Foreign Application Priority Data

Sep. 13, 1982 [JP] Japan ............................... 57-159103

[51] Int. Cl.⁴ .............................................. G06F 3/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,056,843 | 11/1977 | Bishop et al. | 364/200 |
| 4,207,609 | 6/1980 | Luiz et al. | 364/200 |
| 4,348,725 | 9/1982 | Farrell et al. | 364/300 |
| 4,400,773 | 8/1983 | Brown et al. | 364/200 |

OTHER PUBLICATIONS

IBM Tech. Discl. Bull., vol. 19, No. 11, Apr. 1977, "Class Interrupt Status Save" by R. E. Birney et al., pp. 4055-4059.
IBM Technical Disclosure Bulletin, "Varying Attention Interrupt Delay", D. Chu, vol. 19, No. 4, Sep. 1976, pp. 1320-1321.

Primary Examiner—James D. Thomas
Assistant Examiner—William G. Niessen
Attorney, Agent, or Firm—Staas & Halsey

[57] ABSTRACT

A data processing system having a channel processing device provided with an input/output device which requires input/output interrupt. The channel processing device responding to a request for input/output interrupt, propagating the request for input/output interrupt to a central processing unit, and reporting the state of the input/output device to the central processing unit. The channel processing device includes an interrupt detecting circuit which detects the request for input/output interrupt sent from the input/output device to the channel processing device, a status information detecting circuit which detects whether the status information sent from the input/output device to the channel processing unit together with the request for input output interrupt is a predetermined specified value, and a counting circuit which counts a predetermined constant time when the status information detecting circuit detects the predetermined specific value so that the request for input/output interrupt is sent to the central processing unit after the counting means counts the constant time.

3 Claims, 5 Drawing Figures

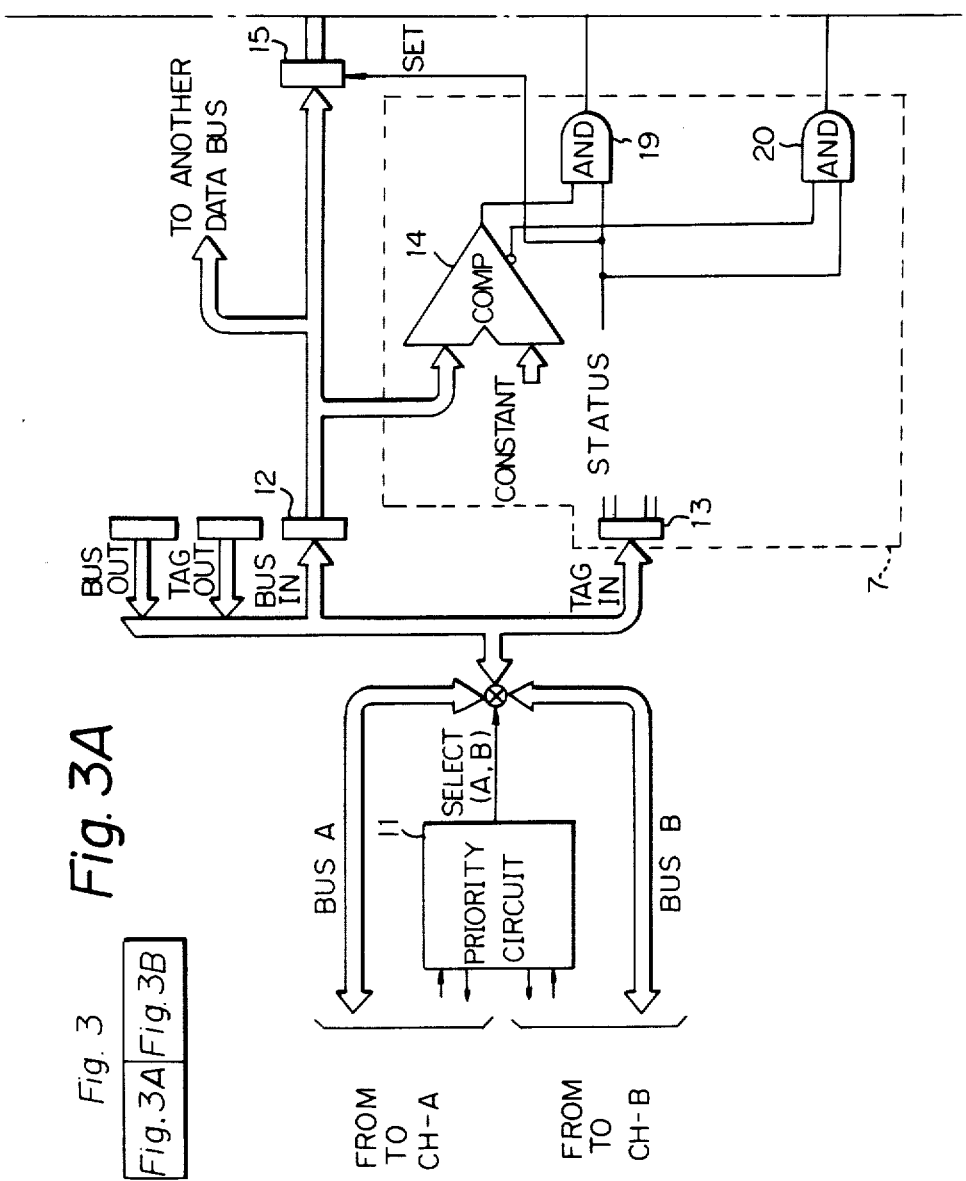

INPUT/OUTPUT INTERRUPT SYSTEM

BACKGROUND OF THE INVENTION (1) Field of the Invention

The present invention relates to a data processing unit and especially to an input/output interrupt system in a channel processing device situated between the input/output device and the central processing unit, for propagating an input/output interrupt from the input/output device to the central processing unit.

(2) Description of the Prior Art

In a conventional data processing device, an input/output device, i.e., a channel device, is formed so as to transmit data via a plurality of paths. However, in such data processing device, preparation for the transmission of data via an alternate path is usually effected by running the control program prepared in the central processing unit. Therefore, a constant time is required.

Due to the recent development of electronic apparatuses, the processing speed of a central processing unit, channel device, etc. is being increased more and more, enabling the electronic apparatuses to be operated more rapidly than conventional apparatuses. Therefore, the time which is required for input/output interrupt, the time which the central processing unit requires for preparation for the transmission of data via an alternate path, and the time which the channel device requires for activation of the input/output device via an alternate path, etc. is decreased as compared with a conventional apparatus.

Therefore, in the aforementioned data processing device, preparation for the transmission of data from the central processing unit via an alternate path is effected during internal initialization of the input/output device after activation via the channel device, that is, after the connection between the input/output device and the channel device is broken after input/output interrupt due to the busy state of the input/output device.

When the input/output device is initializing, the busy state thereof is reported as the central processing unit. Therefore, the alternate path assumes the same state as the primary path, and thus, the phenomenon of hang-up temporarily occurs and the efficiency is decreased.

SUMMARY OF THE INVENTION

An object of the present invention is to eliminate the above-mentioned drawbacks and to prevent the above-mentioned interrupt state, which hinders the transmission of data via an alternate path.

The above-mentioned object can be achieved by providing a data processing system having a channel processing device provided with an input/output device which requires input/output interrupt. The channel processing device responds to a request for input/output interrupt, propagates the request for input/output interrupt to a central processing unit, and reports the state of the input/output device to the central processing unit. The channel processing device includes an interrupt detecting means for detecting the request for input/output interrupt sent from the input/output device thereto, a status information detecting means for detecting whether the status information sent from the input/output device to the channel processing unit together with the request for input/output interrupt is a predetermined specified value, and a counting means for counting a predetermined constant time when the status information detecting means detects the predetermined specified value. The status information detecting means sends the requests for input/output interrupt to the central processing unit after the counting means counts the predetermined constant time.

Further features and advantages of the present invention will be apparent from the ensuing description, made with reference to the accompanying drawings, to which, however, the scope of the invention is in no way limited.

DESCRIPTION OF THE PREFERRED EMBODIMENTS

Figure 1:
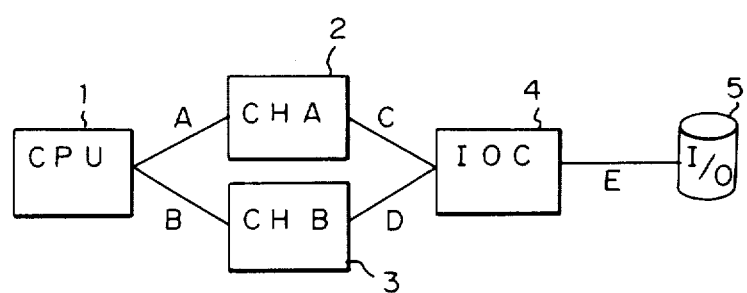
FIG. 1 is a block diagram of the construction of a conventional input/output interrupt system.

FIG. 1 shows the outline of a conventional data processing device. In the drawing, 1 denotes a central processing unit, 2 denotes a channel device A, 3 denotes a channel device B, 4 denotes an input/output control device, and 5 denotes an input/output device.

Usually in the data processing system shown in FIG. 1, the input/output device 5 is formed so as to transmit data via a plurality of paths, that is, a plurality of channel devices 2 and 3. In such a data processing system, the input/output command is activated via one path. If one path is in a busy state, the input/output command is activated via another path, that is, the command is activated via an alternate path. That is, in FIG. 1, we assume that the central processing unit 1 is activated by an input/output start command transmitted to the input/output device 5 via the input/output control device 4 and the channel device 2. In this case, if the input/output device 5 cannot be activated, the input/output device 5 reports the busy state thereof to the channel device 2 via the paths E and C, and the channel device 2 generates an input/output interrupt request to the central processing unit 1. The request is accepted and the interrupt is completed in the central processing unit 1, and the connection between the channel device 2 and the input/output control device 4 is broken.

If the path A-C-E is in a busy state, the central processing unit 1 prepares for activation of the input/output start command via another path (alternate) B-D-E and activates the same. Thus, the data processing system can be operated without the efficiency thereof being decreased.

However, preparation for the transmission of data via an alternate path is usually effected by running the control program prepared in the central processing unit. Therefore, a constant time is required.

On the other hand, in the input/output device 5, if the input/output device 5 is the type that requires initialization of the internal state thereof, the above-mentioned constant time is considered and the connection thereof to the channel device 2 (or 3) and is broken before initialization of the input/output device 5 is completed. Thereafter, input/output interrupt from the channel is executed and the central processing unit 1 prepares for the transmission of data via the alternate path. Thus, when the transmission of data is effected via the alternate path, the other channell device 3 (or 2) is connected to the input/output device 5.

Since, as was mentioned above, the processing speed of the central processing unit, channel device, etc. has been increased more and more, electronic apparatuses be operated more rapidly than can conventional apparatuses. Therefore, the time which is required for input-/output interrupt, the time which the central processing unit 1 requires for the preparation of the transmission of data via an alternate path, and the time which the channel device 3 (or 2) requires for activation of the input-/output device 5 via an alternate path, etc. is decreased as compared with conventional apparatus.

Therefore, in the afore-mentioned data processing system, the transmission of data from the central processing unit 1 via an alternate path is carried out when the input/output device 5 undergoes internal initialization after activation via the channel device 2, that is, after the connection of the channel device 2 to the input/output device 5 is broken after the input/output interrupt due to the busy state of the input/output device 5.

However, in the input/output device 5, the device 5 is initialized so that the busy state thereof is reported to the central processing unit. Therefore, the alternate B-D-E assumes the same state as the primary path A-C-E, and thereby the problem of a hang-up phenomenon temporarily occurs and the efficiency is decreased.

Figure 2:
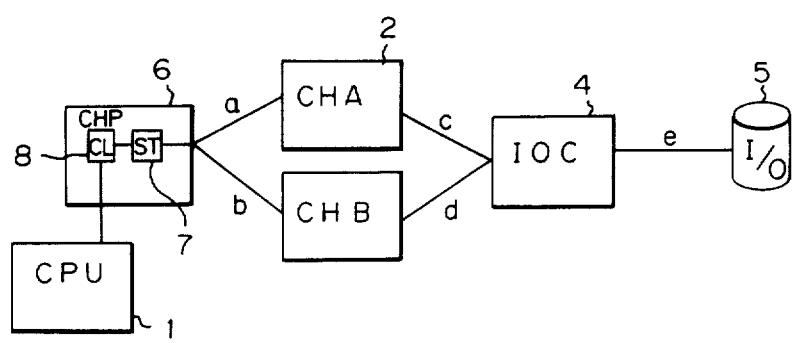
FIG. 2 is a block diagram of an embodiment of the input/output interrupt system according to the present invention.

FIG. 2 is a block diagram of an embodiment of the present invention. In FIG. 2, the same portions as in FIG. 1 are denoted by the same reference numerals and symbols as in FIG. 1. In FIG. 2, 6 denotes a channel processing device CHP, 7 denotes a detecting portion for detecting status information, and 8 denotes a counting circuit. The channel processing device 6 is situated between the central processing unit 1 and the channel devices 2 and 3 and controls communication between each channel device and the central processing unit. In the input/output device 5, i.e., in a type of input/output device which requires a constant time for the internal initialization thereof, as mentioned before, the above-mentioned status of the input/output interrupt can be detected by the detecting portion 7 for detecting status information in the channel processing device 6.

Therefore, in the present invention, if such status information is detected, the counting circuit 8 is driven so that the transmission of an input/output interrupt (the interrupt shows that the primary path is busy) from the channel device 2 to the central processing unit 1 is delayed for a constant time. Accordingly, the timing of activation via the alternate path b-d-e from the central processing unit 1 is also delayed for the above-mentioned constant time so that the problem of the input-/output device 5 initializing when activation is effected via an alternate path, is solved.

Next, the channel processing device is explained with reference to FIG. 3 and FIG. 4.

A priority select circuit 11 selects one of a plurality of channels CH-A, CH-B, ... by using a time division and a priority control process and connects the selected channel to the channel processing device CHP. When a channel is selected, the operation of the channel is controlled by the priority select circuit 11. For example, when the channel CH-A is selected, the content of the bus (BUS IN) is latched in a BUS-IN register 12. At the same time, the content of TAG-IN is latched in a TAG-IN register 13 (see 32 in FIG. 4). The content of the BUS-IN register 12 is supplied to a comparator circuit 14 and is compared with a constant value. That is, the comparator circuit 14 checks whether the output of the BUS-IN reigister 12 is a constant value or not. In this state, when the status STATUS is a constant value, a gate 19 assumes an "ON" state.

When the status STATUS is not a constant value, a gate assumes an "ON" state. In the conventional system, the gate 20 assumes an "ON" state. The operation thereof is shown by the broken line 33 (RQB) in FIG. 4. An interruption request RQB is sent via an interrupt handling circuit 17 to the central processing unit and awaits an interrupt enable ENABLE signal (34 in FIG. 4). When the interrupt enable ENABLE signal is received (35 in FIG. 4), the interrupt request is reset, and, at the same time, the request for status store is generated by a store request handling circuit 18 (36 in FIG. 4). The state of the BUS-IN register 12 is kept in a status register 15 when the TAG-IN register 13 is in an "ON" state. When the store request is issued, the gate 21 assumes an "ON" state and the state of the BUS-IN register 12 is transferred to a main storage unit MSU. When the status store is completed, store-complete information is sent to the store request handling circuit 18 (37 in FIG. 4) and the interruption handling circuit 17 reports the completion of interrupt to the central processing unit. Thereafter, the interrupt process is carried out (38 in FIG. 4) and the device is driven using an alternate path so as to effectively use resources (39 in FIG. 4).

Figure 4:
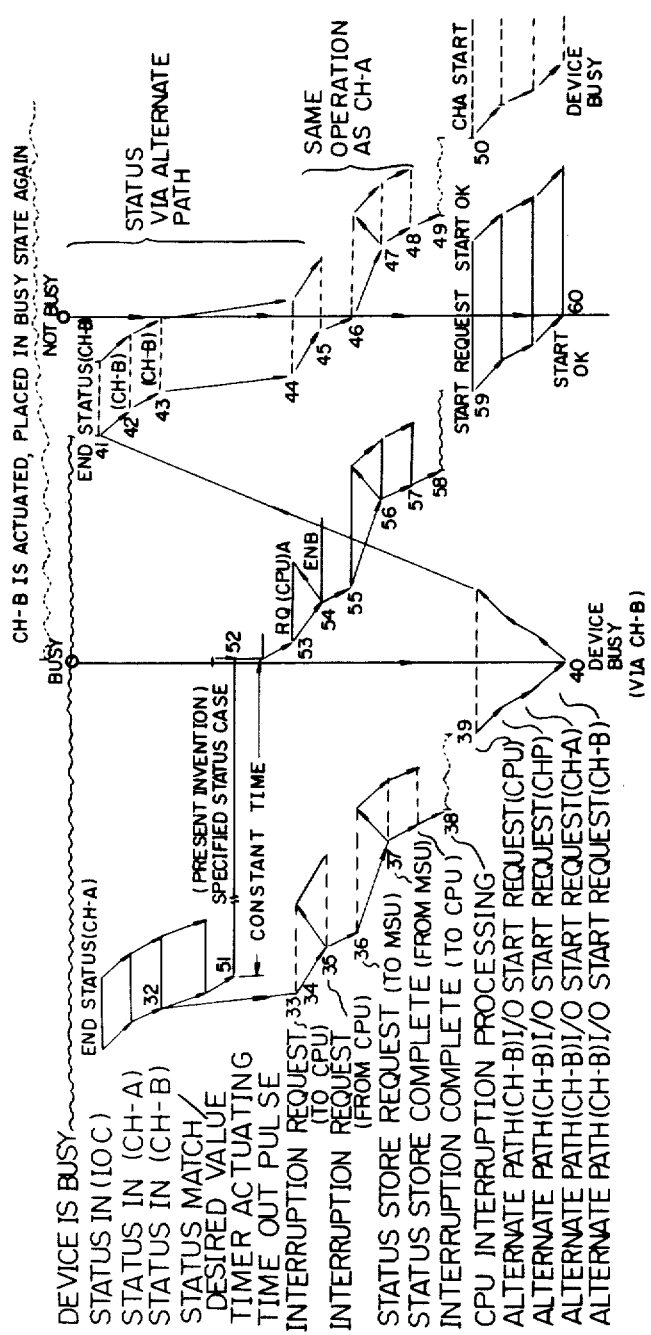
FIG. 4 is a time chart of the operation of the channel processing device of FIG. 3.

In the conventional system, as is shown by the broken line 39 in FIG. 4, when the comparator circuit 14 has the status of a constant value, the circuit 14 remains in a busy state until the status STATUS is reported. In this state, the system is driven by an alternate path (CH-B), and if the operation is transmitted to the input/output control unit, the input/output control unit transmits a busy (BUSY) signal (40 in FIG. 4). Thereafter, the central processing unit recognizes the busy state of the input/output control unit, and when the busy signal from the alternate path (CH-B) is discontinued (41 in FIG. 4), the central processing unit attempts to report the end (END) status. At this time, the busy state of the device, which has already been activated by the channel CH-B, is maintained. Thereafter, the channels CH-A and CH-B are alternately opened and the state thereof is reported, respectively, and a deadlock loop is formed in the soft ware (42 to 50 in FIG. 4).

In the present invention, the reason for the specified interrupt is detected by the comparator circuit 14 and the gate 19, the gate 20 is opened, and the gate 19 is closed so that the counting circuit 8 is driven (51 in FIG. 4). After the counting circuit 8 counts a constant time (52 in FIG. 4), it outputs a time output signal RQA signal to the interruption handling circuit 17. The circuit 17 generates an interrupt request similar to an RQB signal (conventional device) to the central processing unit (53 in FIG. 4). When the interrupt enable signal is received (54 in FIG. 4), the counting circuit 8 is reset so that the following counting operation becomes possible. That is, the counting operation is carried out in a manner similar to that of the conventional system. In FIG. 4, the operations 54 to 59 are similar to the operations 35 to 39.

Figure 3B:
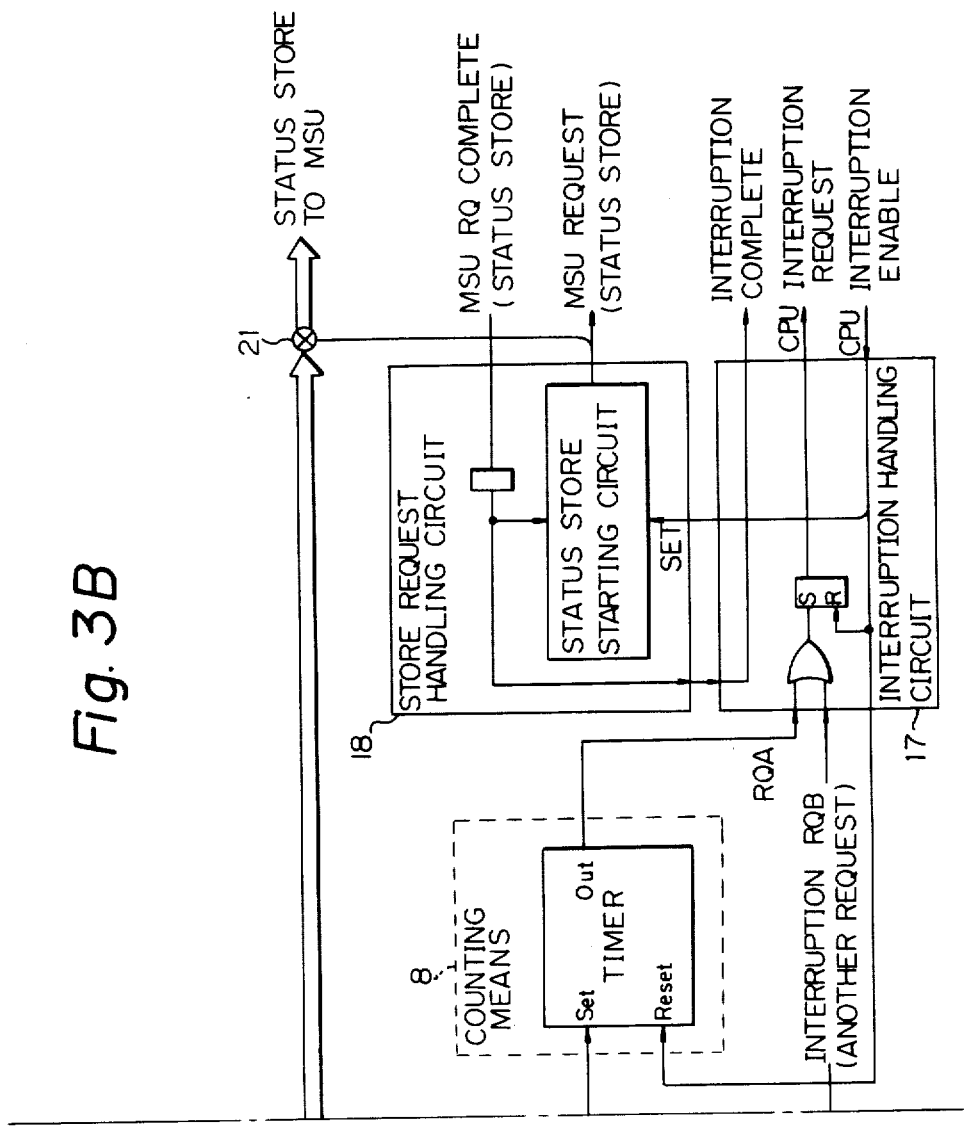
FIG. 3 (including FIGS. 3A and 3B) is a detailed block diagram of the channel processing device of FIG. 2.

In FIG. 4, the RAQ signal is denoted by the solid line, the interrupt operation being delayed for a constant time by the counting means 8 in FIG. 3. Thereafter, the start command from the alternate path reaches the input/output control unit via the channel CH-B. At this time, the busy state of the device is discontinued (60 in FIG. 4). In this case, a busy signal is not formed in the channel CH-B, with the result that the input/output device is started.

As was explained in detail above, according to the present invention, after the counting circuit counts the constant time, the input/output interrupt request is supplied from the channel processing device to the central processing unit. Therefore, the input/output device can be activated via one channel, and if the channel is busy, the input/out device can be activated via another channel so that the phenomenon of hang-up in the software can be effectively avoided.

What is claimed is:

1. A data processing system having a plurality of channels, including a channel processing device for selecting one of the plurality of channels, and including an input/output device for generating an input/output interrupt signal and for providing status information, the channel processing device receiving the status information, responding to the input/output interrupt signal, propagating the input/output interrupt signal to a central processing unit, and reporting the status of the input/output device to the central processing unit, said channel processing device comprising:
    interrupt detecting means, connected to the input/output device, for detecting the input/output interrupt signal sent from the input/output device to the channel processing device;
    status information detecting means, connected to the input/output device, for detecting whether the status information, sent from said input/output device to the central processing unit together with the input/output interrupt signal, is a predetermined specified value and outputting a signal, accordingly; and
    counting means, connected to said status information detecting means, for receiving the signal input from said status information detecting means and counting for a predetermined constant time when said status information detecting means detects said predetermined specified value, said status information detecting means inputting the input/output interrupt signal to the central processing unit after said counting means counts the predetermined constant time.

2. An input/output interrupt system according to claim 1, connected to receive tag-in information, wherein said status information detecting means comprises:
    comparator means, connected to the channel processing device, for comparing the content of the selected one of the various channels with a constant value and providing a comparison signal;
    a tag register, connected to receive the tag-in information, for latching the tag-in information and providing an output signal;
    a first gate, connected to said comparator and said tag register, for receiving the output signal from said tag register and the comparison signal from said comparator means when the content of the selected channel is said constant value, and for providing a gated output signal to said counting means; and
    a second gate, connected to said comparator and said tag register, for receiving the output signal from said tag register and the comparison signal from said comparator means when the content of the selected one of the various channels is not said constant value, and for supplying the request for input/output interrupt.

3. A data processing system receiving status information indicating the state of an input/output means and providing an input/output interrupt signal when the status information is detected, said data processing system comprising:
    a central processing unit;
    channel devices connected to said central processing unit; and
    a channel processing device, connected between said central processing unit and said channel devices, for receiving the status information, and for controlling communication between said central processing unit and said channel devices, said channel processing device comprising:
        detecting means, connected to said channel devices, for detecting the input/output interrupt signal indicating that the status information is in said channel processing device; and
        counting means, connected between said central processing unit and said detecting means, for delaying the transmission of the detected input/output interrupt signal from said channel devices to said central processing unit.

* * * * *